United States Patent Office 3,202,475
Patented Aug. 24, 1965

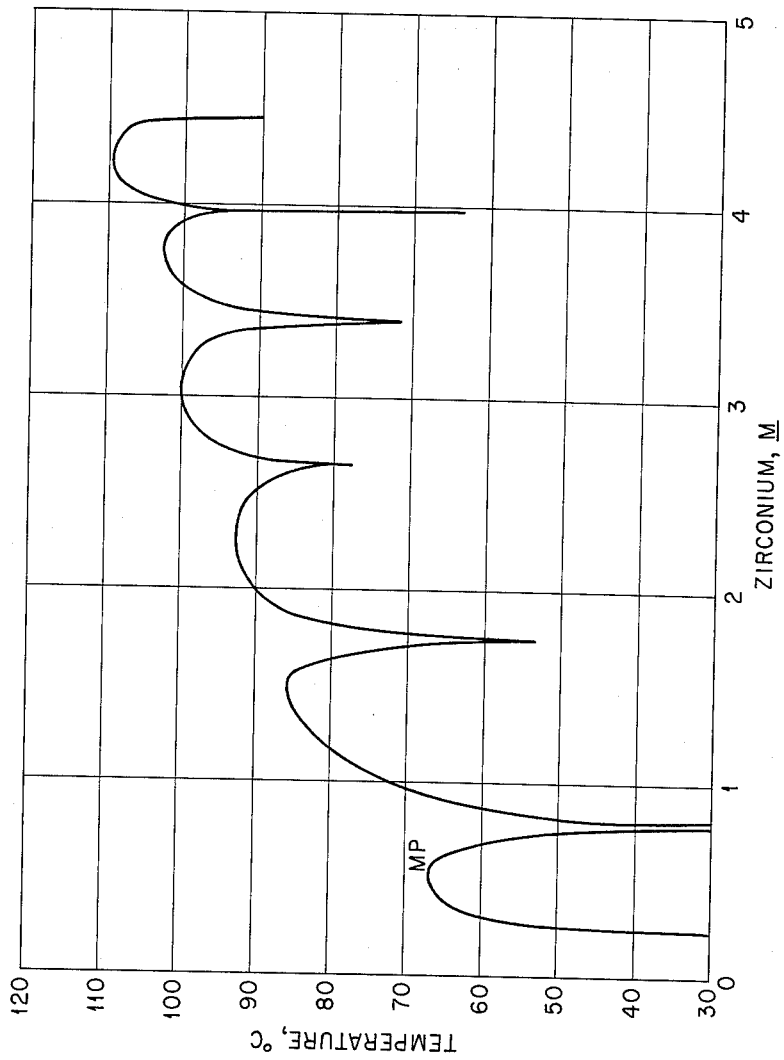

3,202,475
METHOD FOR COLLECTING ZIRCONIUM TETRACHLORIDE
Theodore A. Gens, Oak Ridge, Tenn., assignor to the United States of America as represented by the United States Atomic Energy Commission
Filed May 15, 1963, Ser. No. 280,759
9 Claims. (Cl. 23—14.5)

The present invention relates generally to the chemical processing of irradiated reactor fuel elements. More particularly, it relates to an improved method for disposal of zirconium-containing radioactive gaseous effluents resulting from the chlorination or hydrochlorination of irradiated solid nuclear fuels comprising a fissile fuel material and zirconium.

In the processing of zirconium clad nuclear fuel elements for the purpose of separating and decontaminating unburned fuel values by solvent extraction techniques, it has been found desirable to remove the Zr before preparing a virtually zirconium-free nitric acid solvent extraction feed solution. By removing the Zr beforehand, the use of large amounts of corrosive fluoride used to dissolve the Zr is avoided. Thus, a more desirable feed solution for the solvent extraction process can be prepared. To meet this problem, it has been proposed to separate the zirconium from the irradiated fuel by a chloride volatility process, known as the Zircex process, in which the zirconium-bearing fuel is contacted with gaseous hydrogen chloride at a temperature in the range 350° C.–800° C. to selectively volatilize zirconium as a gaseous effluent comprising zirconium tetrachloride and other volatile fission product chlorides. To maintain the $ZrCl_4$ as a gas, it must be heated to a temperature of at least about 325° C. To recover the uranium from the resultant hydrochlorination residue, the residue can be dissolved in water in preparation for solvent extraction. The uranium can also be purified by non-aqueous methods, for example, by fluorinating the hydrochlorination residue to form $UF_6$ and then distilling the $UF_6$.

Prior to this invention, it was proposed to condense or desublime this gaseous effluent, which in effect comprises a smoke of finely divided submicron particles of radioactive zirconium tetrachloride, onto the walls of a collection vessel and then to remove the condensed metal chlorides by standard mechanical scraping or doctoring means or the like. However, because of the highly radioactive environment and out of a necessity for considering the attendant safety hazards, it has been found that an excessive number of unit operations were required for the remote transfer and handling of the solid zirconium chloride effluent. Moreover, said solid effluent was found to have non-uniform and non-reproducible characteristics which made it difficult to deal with once it had been collected. In addition, it was found that mechanical removal methods were inefficient because of the tendency of the deposited chloride particles to agglomerate.

It is accordingly a major object of this invention to provide a simplified and safe method for the disposition of a radioactive gaseous composition containing zirconium chlorides. Another object of this invention is to collect a radioactive gas comprising zirconium tetrachloride with virtually total efficiency where the efficiency is defined as the amount of tetrachloride collected over the total amount treated. Another object of this invention is to collect Zr tetrachloride by a method easily adaptable to continuous operation. Another object of this invention is to convert a radioactive gaseous composition of the character described into a form which may be readily disposed of as a fairly homogeneous liquid or as a solid in a safe and economic manner. Still another object of this invention is to covert a radioactive vapor containing zirconium chlorides and other metal fission product chlorides into a form amenable for treatment to allow selective separation of certain useful radioactive isotopes. A further object of this invention is to prepare a highly densified zirconium chloride product resulting from the vapor phase hydrolysis of zirconium tetrachloride.

These and other objects of this invention are realized by contacting a gas of the character described with the vapor in equilibrium above a refluxing aqueous hydrochloric acid solution wherein the upper limiting concentration of hydrogen chloride in said solution is the HCl-water azeotrope. Under these conditions, rapid hydrolysis and hydration of the zirconium tetrachloride gas and other volatile metal fission product chlorides occur in the vapor phase with substantially no deposition of solids onto the walls of the collection vessel in which said hydrolysis takes place. This vapor phase hydrolysis reaction may be conducted in simple and readily available laboratory apparatus normally found in a chemical laboratory and may consist, for example, of a multi-necked glass or non-corroding metal flask fitted with a heating mantle to heat the initial water or hydrochloric acid solution to its refluxing temperature, a reflux condenser to allow removal of excess hydrogen chloride, water vapor and other gases, and means for introducing a jet stream of gaseous zirconium tetrachloride into the vapor in equilibrium above the refluxing solution. With this setup, the invention may then be very simply carried out by introducing a jet stream of radioactive zirconium tetrachloride of the character described into the vapor above the refluxing hydrochloric acid solution. The hydrolysis reaction, as previously noted, is virtually instantaneous and the resultant zirconyl chloride and other hydrolized metal chlorides are then washed into the refluxing solution. Any by-product gases, such as hydrogen and volatilized hydrogen chloride will be distilled out of the solution. Repeated analyses of the distilled vapors reveal no detectable presence of zirconium contained in the initial zirconium tetrachloride gas feed. Thus, the zirconium tetrachloride is removed from the off-gas where it exists as a vapor, into the hydrochloric acid solutions where it forms a soluble salt, and the problem of handling a non-uniform solid is avoided. Assuming an initial hydrolysis solution of refluxing water, the solution soon reaches the azeotropic hydrochloric acid-water composition. As increasing concentrations of zirconyl chlorides are washed into the solution, the boiling point of the solution will rise from an initial 100° C. to a temperature in the approximate range 110° C.–113° C. As solutions of zirconyl chlorides are cooled they will be found to consist in effect of a series of compounds represented by the general formula:

$ZrOCl_2 \cdot HCl \cdot nH_2O$ where $n$ decreases with increasing Zr concentration and the range of compounds have a melting point falling within the range 90° C.–105° C.

The solutions which are formed have an extraordinarily high solubility for zirconium. The maximum concentration of zirconium absorbed by the refluxing solution is about 4 molar, equivalent to about 365 grams zirconium per liter, before the freezing point of the solution approaches within 5% of the boiling point of said solution.

In addition to its simplicity, the process of this invention is readily amenable for operation in a continuous manner in which a zirconyl chloride solution of desired zirconium molarity is continuously drawn off as product, and fresh water is added to the collection vessel. This is a significant advantage over the large solids-condensers previously used for collecting $ZrCl_4$ in a batch-type operation.

The efficiency of zirconium tetrachloride collection as a soluble zirconyl chloride under the above-described conditions is extremely high ranging from an extent of 98% to 100%. Any remaining zirconium tetrachloride which is not hydrolyzed to zirconyl chloride is converted to a finely divided smoke of zirconia particles. Conversion to zirconia is undesirable and should be avoided because it merely reintroduces the problem initially sought to be circumvented. That is to say, if the zirconium tetrachloride gas were completely or substantially completely converted to zirconia, one would merely be exchanging the collection and entrainment problems mentioned in connection with the zirconium tetrachloride vapor to one in which a radioactive cloud of submicron size zirconia particles were involved.

According to the present invention, the temperature of the vapor above the refluxing solution largely controls the hydrolysis temperature at which zirconyl chloride is formed to the virtual exclusion of zirconia. The amount of unwanted zirconia hydrolysis by-product can be reduced to a minimum by the addition of an inert pressurized gas such as nitrogen to the $ZrCl_4$ feed vapor to accelerate the flow of the said vapor thereby causing the vapor phase hydrolysis to occur at a temperature as close to the water vapor temperature (about 100° C.) as possible. The highest efficiency of conversion of the $ZrCl_4$ to the water soluble zirconyl chloride will occur at the water vapor temperature (about 100° C.) rather than at the temperature of the $ZrCl_4$ vapor (in excess of about 300° C.).

Concentration of the aqueous waste solution to about 4 M Zr by distilling off hydrochloric acid is desirable in order to reduce the costs of waste storage. During distillation the solution contains azeotropic hydrochloric acid; however, the hydrogen chloride-water azeotrope is affected by the presence of the zirconyl ion, which decreases the hydrogen chloride and water concentration and also associates with the water and hydrogen chloride to form a weakly-bonded hydrate compound. Thus, at any point during distillation, the solution composition may be regarded as comprising a complex hydrate-type compound containing zirconyl chloride, hydrogen chloride and water, or a mixture of two of these complex hydrate compounds. These compounds are not stable enough to distill; distillation removes only hydrogen chloride and water. Of course, it will be apparent that collection of zirconium values may proceed without distillation, or distillation may be effected after collection, if it is desired to increase the zirconium concentration in solution.

The effect of this behavior on the distillation process which may occur concurrently with the vapor phase hydrolysis of $ZrCl_4$ was investigated by dissolving either $ZrOCl_2 \cdot 8H_2O$ or zirconium tetrachloride in hydrochloric acid and distilling until the boiling point remained constant. Melting points of the product were determined from inflections in a time vs. temperature curve upon cooling. After the melting point determinations, the volumes at the melting points were measured and the salt was dissolved in water and analyzed for zirconium. The results are plotted in the accompanying figure and show that, during distillation of zirconyl chloride-hydrogen chloride solutions, a series of compounds are obtained with melting points increasing with increasing zirconium content. As shown in the figure, a product solution containing more than 1 M Zr will solidify upon cooling to room temperature.

More importantly, at about 4.3 M Zr, the melting point (~105° C.) of the Zr complex is almost as high as the boiling point (~110° C.), so that the maximum zirconium concentration which can be practically achieved is about 4 M without solidification at the reflux temperature. Thus, by hydrolyzing zirconium tetrachloride in the vapor phase and distilling off hydrochloric acid, a product waste containing up to 365 grams of zirconium per liter can be obtained.

After the refluxing solution has reached a zirconium concentration in the range 90 to 365 grams per liter, equivalent to about 1–4 molar Zr, it will solidify to a substantially homogeneous solid mass which can be disposed of in a number of ways to be described hereinafter. In one case, this solid mass may simply be stored, for example, in a plastic-lined metal container for ultimate disposal as a fission product waste concentrate. In this connection, it should be noted that a major factor in considering the stability of fission concentrates is related to the sustained evolution of heat from the radioactive decay of said fission products. The zirconyl chloride composition has a high enough thermal conductivity so that it will not develop a strong temperature gradient within its volume and melt.

On the other hand, the zirconium chloride solid product may serve as a ready source from which useful radioactive isotopes may be separated by standard solvent extraction technology. To accomplish this purpose, the solid zirconyl chloride composition produced by the vapor phase hydrolysis of the gaseous $ZrCl_4$ effluent, must be converted into a suitable solvent extraction feed solution. This may readily be accomplished by liquefying the solid zirconyl chloride at a temperature in the range 70° to 110° C. and sparging the resultant liquid with a concentrated aqueous solution of hydrogen peroxide (in the range 10 M to 17 M $H_2O_2$) to lower the melting point of the $ZrOCl_2 \cdot H_2O$ complex salts to the point where a solution, stable at a temperature ranging from the boiling point (~100° C.) to the melting point (−25° C.), may conveniently serve as a solvent extraction feed solution to selectively extract certain desirable fission products therefrom with organic solvents.

I have found that the melting point of hydrated zirconyl chloride is highly dependent on the chloride content in solution. For example, addition of only a small amount of HCl to an azeotropic hydrochloric acid solution containing $ZrOCl_2 nH_2O$ causes a sharp rise in the melting point of the resulting composition. It is therefore clear that the addition of hydrogen peroxide to lower the freezing point of hydrochloric acid solution containing up to 4 M Zr (the practical upper Zr concentration in the azeotropic solution) from 110° C. to below room temperature is extremely advantageous in several respects. First, the lowering of the melting point is obtained without increasing the volume of the resultant solution. This is an extremely important consideration in dealing with radioactive solutions to be treated by solvent extraction processes. Normally, the melting point of the $$ZrOCl_2 \cdot H_2O \cdot HCl$$

complex could be lowered by the simple expedient of mixing with water (in this case, at least about 5 volumes). In marked contrast, a simple sparging of the high melting hydrochloric acid solution with small amounts of concentrated $H_2O_2$ will lower the melting point rapidly and efficiently with no increase in radioactive volume. After treatment with hydrogen peroxide, the product solution can be reduced in volume by distilling off water to yield stable solutions at room temperature containing up to 6.6 M Zr. By stable is meant solutions which will not solidify, jell or precipitate over an extended period of at least several days at a temperature in the range from about 25–60° C. Product solutions containing 7 M zirconium were found to jell soon after cooling to room temperature and are not suitable as solvent extraction feed solutions. The melting point of the zirconyl chloride compositions may also be effected by sparging the liquid of such compositions with ozone gas.

It will be seen that a simple and versatile method of treating gaseous $ZrCl_4$ has been provided, of particular utility where said gas is radioactive, to convert said gas directly into a manageable relatively high melting liquid or solid. In either form, it may readily serve as a radioactive storageable sink of unwanted fission products. Additionally, the melting point of the liquid may be simply and economically lowered to allow the formation of a solution which can serve as a stable solvent extraction feed solution for extraction of valuable fission product isotopes.

I have, in addition, also discovered that the melting point of the zirconyl chloride solutions produced by this invention is not affected by the addition of up to 20 grams per liter of uranium thereto. This discovery can be applied to extend the utility of the process of this invention to include the treatment of a $ZrCl_4$ gas containing uranium. Thus, instead of applying the process of this invention to the gaseous effluent resulting from the selective hydrochlorination of a uranium-zirconium composition (i.e. processes of the Zircex type), the uranium and zirconium may be simultaneously chlorinated and volatilized by treatment with gaseous chlorine, for example, at a temperature in the range 350° C.–800° C. The resulting uranium chloride-zirconium chloride vapor will be readily hydrolyzed in the vapor phase as described, followed by adjustment of the melting point to form a stable uranium-containing solvent extraction feed solution.

Thus, I have prepared a stable solvent extraction feed solution containing 4 M Zr, 1 M U, 1 M Cl and 0.1 M in $NO_3$ and in a batch-type solvent extraction system contacted said solution with an extractant consisting of 30 vol. percent solution of tributyl phosphate dissolved in Amsco—an inert hydrocarbon diluent and have achieved an effective uranium extraction as shown in the following table.

| Fraction | Percentage of total | |
|---|---|---|
| | U | Zr |
| 1st TBP extract | 84.0 | 0.0006 |
| 2d TBP extract | 13.8 | *ND |
| 3d TBP extract | 1.94 | *ND |
| Aqueous raffinate | 0.29 | 100.00 |

*ND = None detectable.

It will be clear from the data and the preceding description to those skilled in the art that efficient and quantitative uranium extraction may be effected either on a batch or continuous basis and that efficient uranium extraction may be effected from solutions containing as much as 6 M zirconium. This is an extraordinary advantage when compared to prior art solvent extraction processes involving the use of aqueous feeds containing fluoride ion to dissolve the zirconium. In such fluoride solutions, the maximum practical zirconium loading cannot exceed more than about 0.5 M. zirconium.

While this invention has been described with respect to its utilitarian aspects in treating a radioactive zirconium tetrachloride gas, it can be used with advantage in collected non-radioactive zirconium tetrachloride vapor as well to produce a concentrated aqueous solution of zirconium. In the normal commercial practice, zirconium tetrachloride is produced by chlorination of zirconium oxide and the resultant gaseous zirconium tetrachloride is condensed in massive condensers whose temperature must be carefully controlled to insure the production of a high density product rather than an undesirable light fluffy product. The $ZrCl_4$ thus produced is dissolved in water and subsequently separated from hafnium, if necessary. In contrast to that, in accordance with this invention, the cumbersome $ZrCl_4$ batch collection problem previously adverted to, is obviated and the solution of zirconyl chloride is prepared directly from the gaseous zirconium tetrachloride.

It is clear from the foregoing description that a highly densified zirconyl chloride liquid or solid product containing up to about 365 grams Zr per liter can be obtained with relative ease and economy in accordance with my invention to realize the disclosed and other advantages which may be appreciated by those skilled in the art.

Having thus described my invention, I claim:

1. A method of condensing a gas comprising zirconium tetrachloride which comprises contacting said gas with the vapor in equilibrium over refluxing hydrochloric acid to form an aqueous solution of zirconyl chloride containing up to about 365 grams of Zr per liter.

2. A method of condensing a gas comprising zirconium tetrachloride which comprises contacting said gas with the vapor in equilibrium over refluxing water to form an aqueous solution of zirconyl chloride containing up to about 365 grams of Zr per liter, and thereafter contacting the said zirconyl chloride solution with a reagent selected from hydrogen peroxide and ozone to adjust the melting point of the zirconyl chloride compound.

3. In a method of treating a neutron-irradiated nuclear fuel composition containing zirconium and a nuclear fuel selected from uranium and plutonium by hydrochlorination of said composition with gaseous hydrogen chloride at a temperature in the range 350° C. to 800° C. to selectively volatilize zirconium tetrachloride and volatilize fission product chlorides, the improvement which comprises contacting a jet stream of said zirconium tetrachloride-containing vapor with the vapor in equilibrium above refluxing water.

4. In a method of treating a neutron-irradiated nuclear fuel composition containing zirconium and a nuclear fuel selected from uranium and plutonium by hydrochlorination of said composition with gaseous hydrogen chloride at a temperature in the range 350° C. to 800° C. to selectively volatilize zirconium tetrachloride and fission product chlorides, the improvement which comprises contacting a jet stream of said zirconium tetrachloride-containing vapor with the vapor in equilibrium above a refluxing solution of hydrochloric acid.

5. The method of claim 3 in which the jet stream of gaseous chlorides is pressurized with an inert gas.

6. In a method of treating a neutron-irradiated nuclear fuel composition containing zirconium and a nuclear fuel selected from uranium and plutonium by chlorination of said composition with gaseous chlorine at a temperature in the range 350° C. to 800° C. to selectively volatilize zirconium, uranium, plutonium and other volatile fission product chlorides, the improvement which comprises contacting a jet stream of said zirconium tetrachloride-containing vapor with the vapor in equilibrium above refluxing water to thereby effect hydrolysis and hydration of said volatile chlorides, collecting said hydrolyzed and hydrated chlorides into said solution to form a solution containing up to about 365 grams zirconium per liter and then contacting said zirconium-containing solution with a reagent selected from hydrogen peroxide and ozone to lower the melting point of the resultant zirconyl chloride composition and thereby reach a solution containing up to about 600 grams of Zr per liter.

7. The method according to claim 6 wherein the uranium is separated from the resultant zirconyl chloride solution.

8. A method for treating a gas comprising a volatile uranium chloride and zirconium tetrachloride which comprises contacting said gas with the vapor in equilibrium above an aqueous solution of hydrochloric acid to hydrolize and hydrate said chlorides in the vapor phase, collecting the hydrolyzed and hydrated chlorides into the hydrochloric acid and treating the resultant zirconyl chloride solution with a reagent selected from hydrogen peroxide and ozone until the melting point of the resultant zirconyl chloride composition reaches a desired level.

9. In a method of treating a neutron-irradiated nuclear fuel composition containing zirconium and a nuclear fuel selected from uranium and plutonium by hydrochlorination of said composition with gaseous hydrogen chloride at a temperature in the range 350° C. to 800° C. to selectively volatilize fission product chlorides including zirconium tetrachloride, the improvement which comprises contacting a jet stream of said zirconium tetrachloride-containing vapor with the vapor in equilibrium above refluxing water to thereby effect hydrolysis and hydration of said volatile chlorides, collecting said hydrolyzed and hydrated chlorides into said solution to form a solution containing up to about 365 grams zirconium per liter and then cooling the resultant zirconyl chloride solution until it solidifies.

References Cited by the Examiner

UNITED STATES PATENTS

| 2,942,944 | 6/60 | Wilhelm et al. | 23—87 X |
| 3,043,653 | 7/62 | Gens | 23—14.5 |

OTHER REFERENCES

AEC Document TID–7534, May 1957, pp. 253, 254.

CARL D. QUARFORTH, *Primary Examiner.*

REUBEN EPSTEIN, *Examiner.*